United States Patent [19]

Leonardi et al.

[11] Patent Number: 5,740,280
[45] Date of Patent: *Apr. 14, 1998

[54] IMAGE REPRESENTATION USING TREE-LIKE STRUCTURES

[75] Inventors: Riccardo Leonardi, Geneva, Switzerland; Bruce F. Naylor, Summit; Hayder Sadiq Radha, Freehold, both of N.J.

[73] Assignee: Lucent Technologies Inc., Murray Hill, N.J.

[*] Notice: The term of this patent shall not extend beyond the expiration date of Pat. No. 5,274,718.

[21] Appl. No.: 131,261

[22] Filed: Oct. 1, 1993

Related U.S. Application Data

[63] Continuation of Ser. No. 769,138, Sep. 30, 1991, Pat. No. 5,274,718.

[51] Int. Cl.$^6$ ............................................. H04N 1/41
[52] U.S. Cl. ............................................. 382/240; 358/426
[58] Field of Search ......................... 382/21, 22, 37, 382/56, 240, 243; 358/426

[56] References Cited

U.S. PATENT DOCUMENTS

| | | | |
|---|---|---|---|
| 4,189,711 | 2/1980 | Frank | 382/22 |
| 4,831,659 | 5/1989 | Miyaoka et al. | 382/56 |
| 4,868,653 | 9/1989 | Golin et al. | 358/136 |
| 4,944,023 | 7/1990 | Imao et al. | 382/21 |
| 4,947,447 | 8/1990 | Miyaoka et al. | 382/56 |
| 5,058,186 | 10/1991 | Miyaoka et al. | 382/62 |
| 5,274,718 | 12/1993 | Leonardi et al. | 382/56 |

OTHER PUBLICATIONS

Wu, "Image Coding by Adaptive Tree-Structured Segmentation", Dec. '91, IEEE pp. 73-82.
"The Computer Glossary", Fifth Edition, Alan Freedman.

Primary Examiner—Joseph Mancuso
Assistant Examiner—Jon Chang
Attorney, Agent, or Firm—Eugene J. Rosenthal

[57] ABSTRACT

An image, having N dimensions, is partitioned into a set of bounded arbitrarily shaped regions. This partitioning is achieved through the use of arbitrarily shaped N-1 dimensional surfaces which pass through the boundaries of the image. The arbitrarily shaped regions are represented in the leaf nodes of a binary tree and the arbitrarily shaped surfaces, which are used to partition the image, are represented in the non-leaf nodes of the tree. In a preferred embodiment, arbitrarily oriented lines passing through the image boundaries are employed to partition a two-dimensional image into a set of convex regions. The convex regions are represented in the leaf nodes of a binary tree and the arbitrarily oriented lines, which are used to partition the image, are represented in the non-leaf nodes of the tree. Furthermore, the arbitrarily oriented lines are selected through the use of a Hough transform and the image is partitioned, along the selected lines, in a recursive manner as the binary tree is developed.

17 Claims, 5 Drawing Sheets

IMAGE REPRESENTATION USING TREE-LIKE STRUCTURES

This is a continuation of application Ser. No. 07/769,138 filed Sep. 30, 1991 now U.S. Pat. No. 5,274,718.

TECHNICAL FIELD

This invention relates to image representation and more particularly to representing images using tree structures.

BACKGROUND OF THE INVENTION

Representation of two- and three-dimensional objects by tree structures has been extensively used in solid modeling, computer graphics, computer vision and image processing. More particularly, quadtrees, which are used to represent objects in two-dimensional space, and octrees, which are the extension of quadtrees into three-dimensional space, have been studied thoroughly for applications in graphics and image processing. However, quadtree- and octree-based image representations are rigid and inflexible. For example, an image represented by a quadtree can only be rotated through angles which are multiples of 90 degrees. Also, such tree structures tend to be very deep when used to represent complex images and, therefore, a large number of bits are required to represent the image.

SUMMARY OF THE INVENTION

The problems with prior tree based image representation techniques are overcome, in accordance with the principles of the invention, by partitioning an image, having N dimensions, into a set of bounded arbitrarily shaped regions. This partitioning is achieved through the use of arbitrarily shaped N−1 dimensional surfaces which pass through the boundaries of the image. The arbitrarily shaped regions are represented in the leaf nodes of a binary tree and the arbitrarily shaped surfaces, which are used to partition the image, are represented in the non-leaf nodes of the tree.

In a preferred embodiment, arbitrarily oriented lines (which are one-dimensional "surfaces") passing through the image boundaries are employed to partition a two-dimensional image into a set of convex regions. The convex regions are represented in the leaf nodes of a binary tree and the arbitrarily oriented lines, which are used to partition the image, are represented in the non-leaf nodes of the tree. Furthermore, the arbitrarily oriented lines are selected through the use of a Hough transform and the image is partitioned, along the selected lines, in a recursive manner as the binary tree is developed.

BRIEF DESCRIPTION OF THE DRAWING

In the drawing:

Shown in FIG. 1 is a flow chart of the steps necessary for representing an image using a binary space partitioning true, in accordance with the principles of the invention;

Figure 1:
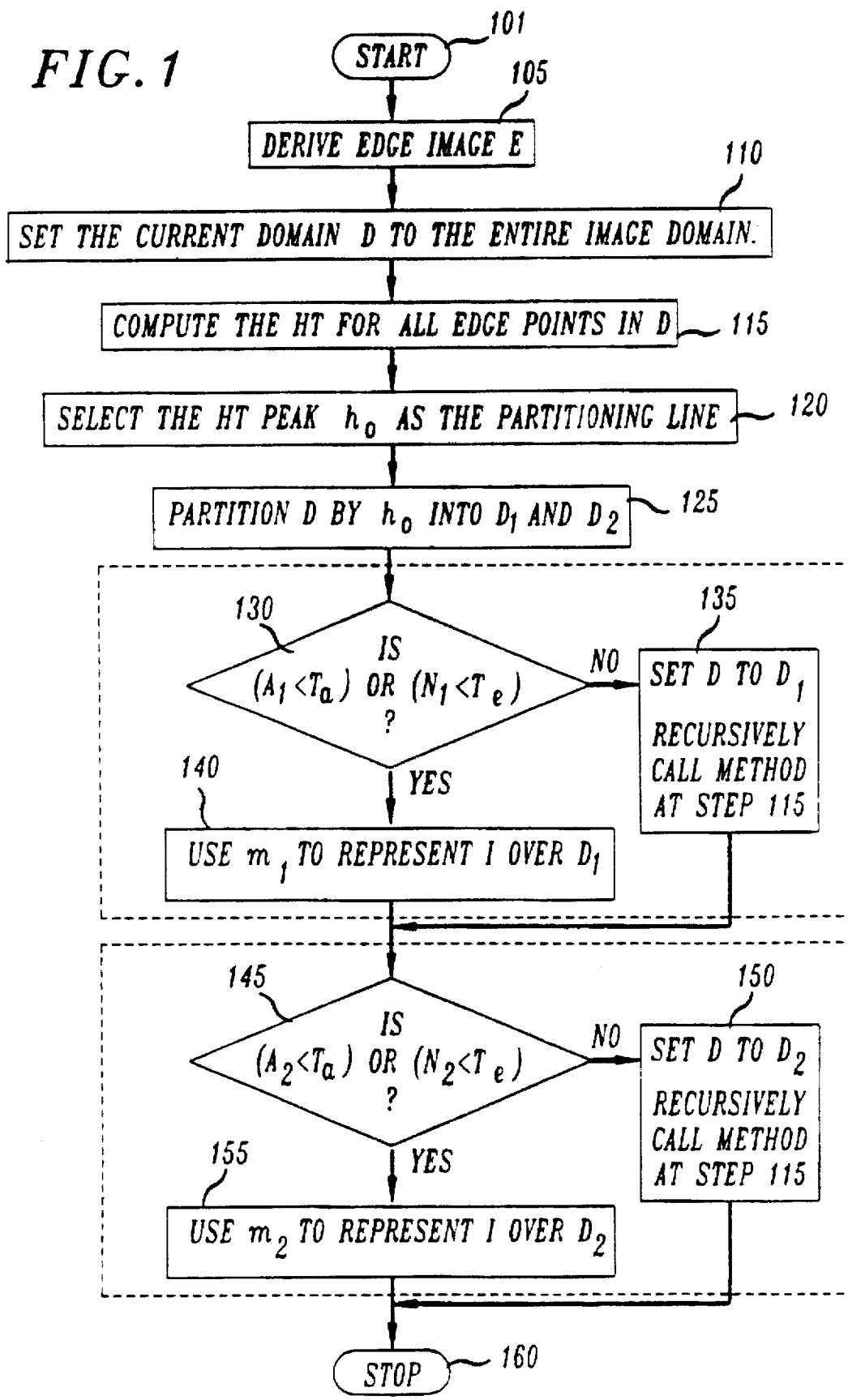
Figure 2:
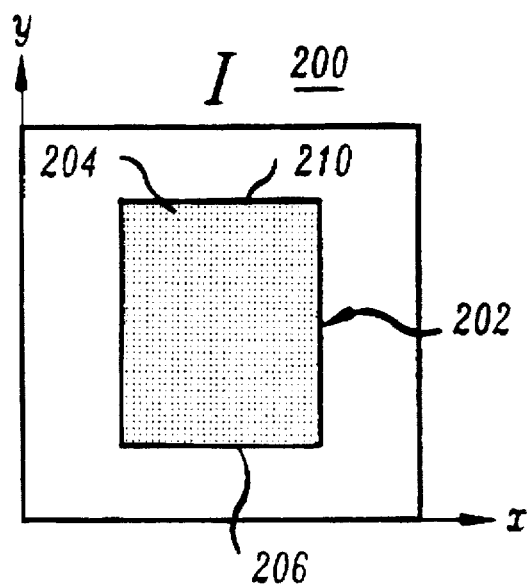
Figure 3:
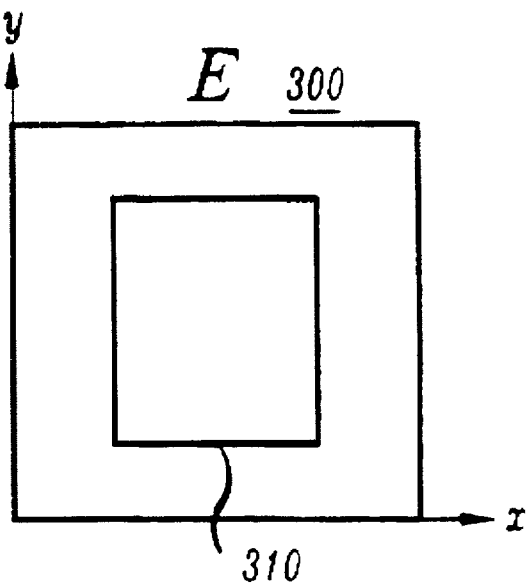
Figure 4:
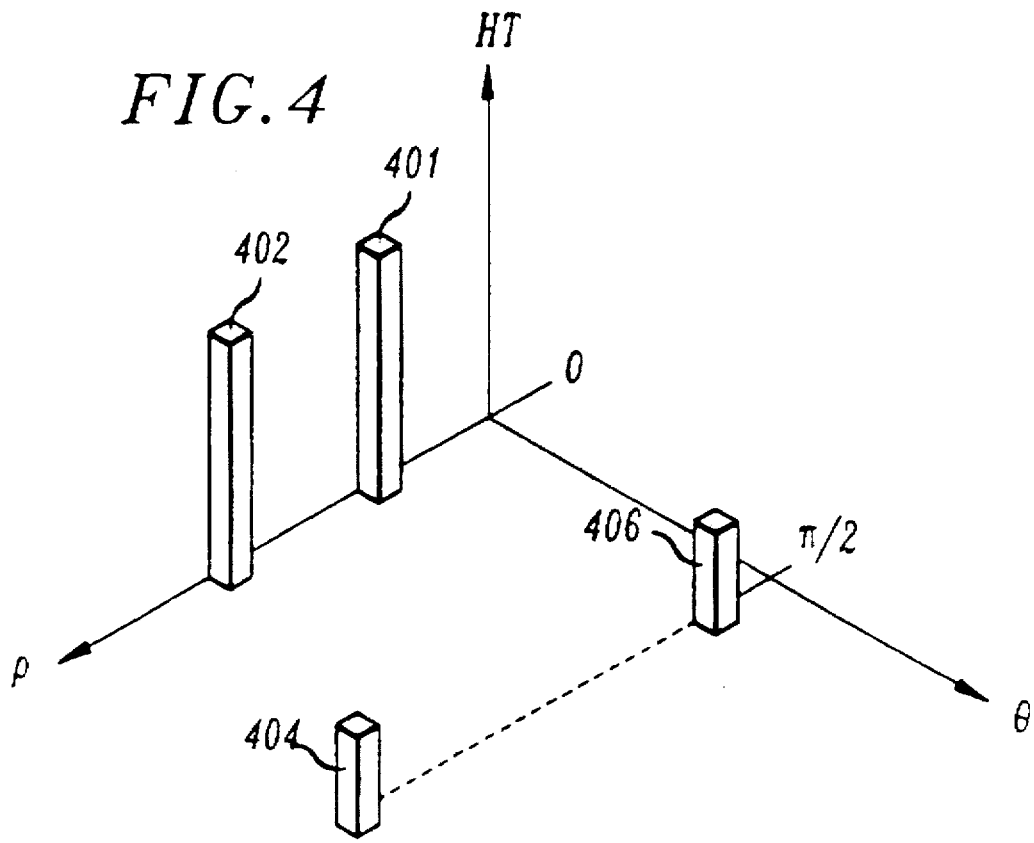
Figure 5:
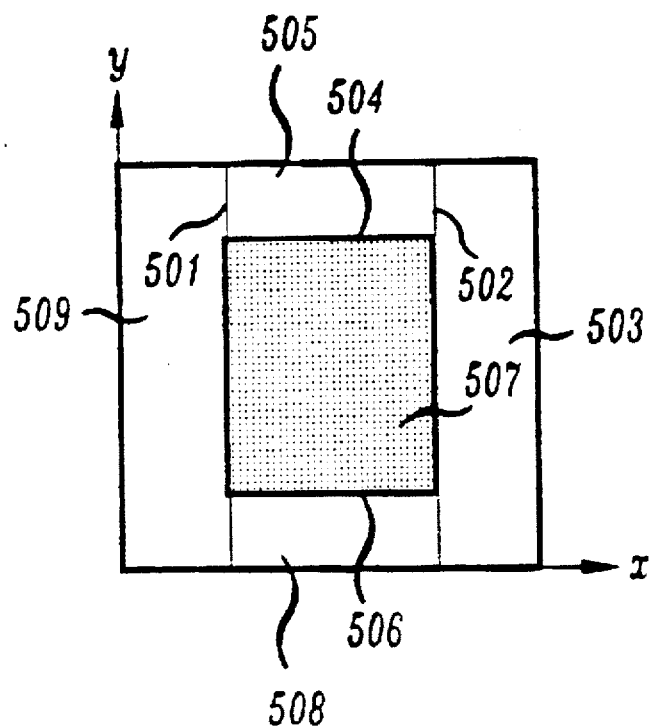
Figure 6:
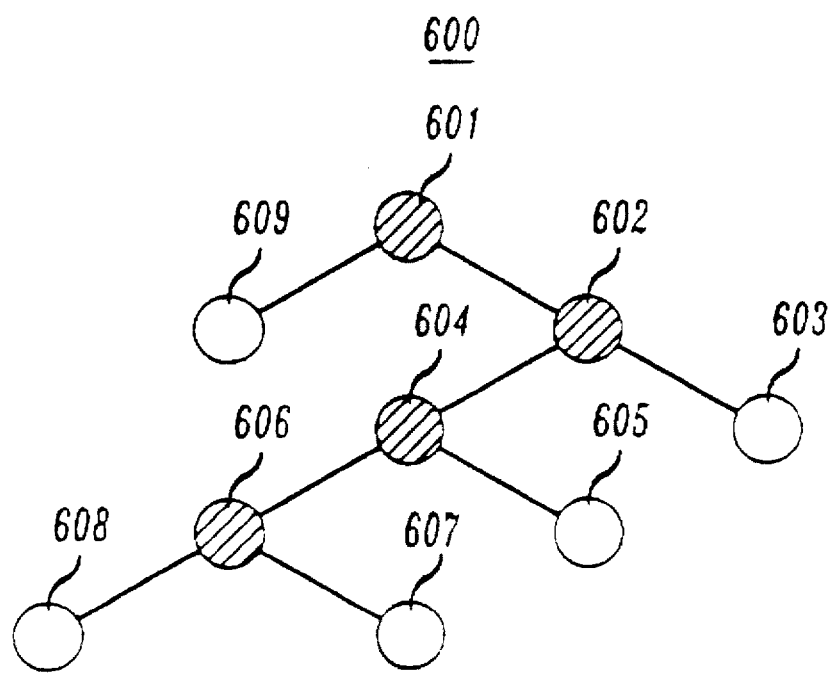
Figure 7:
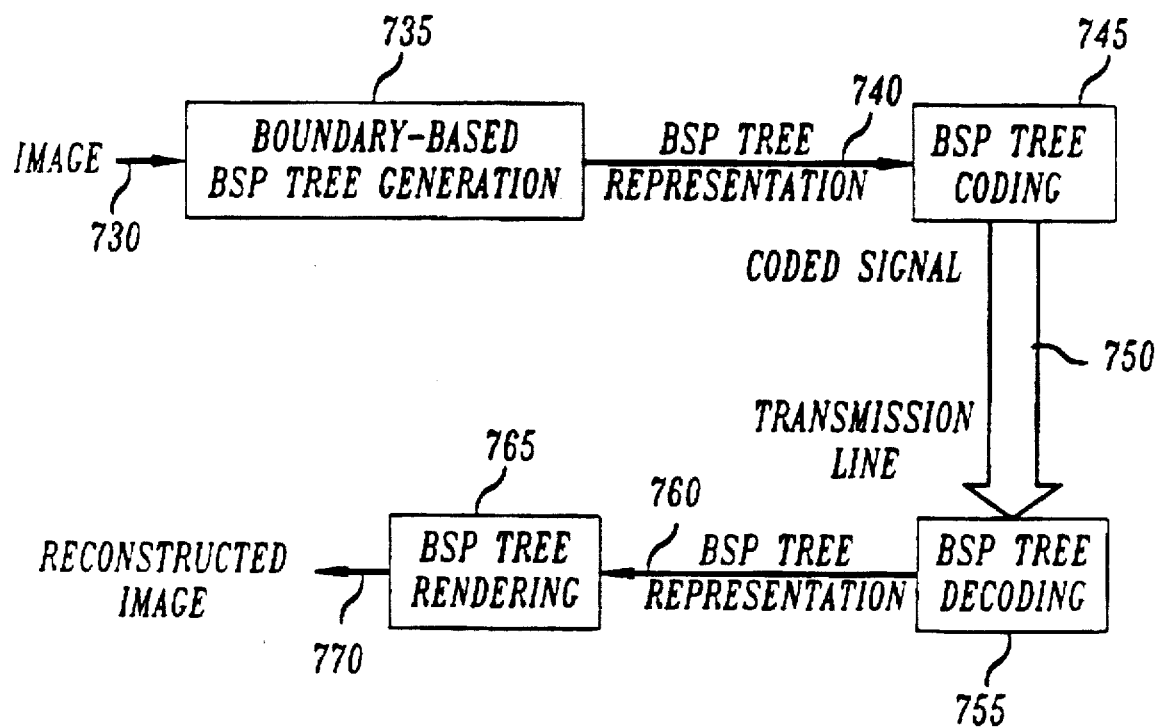
Figure 8:
Figure 9:
Figure 10:
Figure 11:

Shown in FIG. 2 is an image which is employed to demonstrate the operation of the method shown in FIG. 1;

Shown in FIG. 3 is the edge image that corresponds to the image of FIG. 2;

Shown in FIG. 4 is a Hough transform corresponding to the edge image of FIG. 3;

Shown in FIG. 5 are the selected partitioning lines and the unpartitioned convex regions resulting from applying the method of FIG. 1 to the image of FIG. 2;

Shown in FIG. 6 is an exemplary binary tree structure for representing the image of FIG. 2, in accordance with the principles of the invention;

Shown in FIG. 7 is an exemplary image encoding, transmission and reproduction system, embodying principles of the invention;

Shown in FIG. 8 is an exemplary original image;

Shown in FIG. 9 are the partitioning lines which were selected in the generation of a binary space partitioning tree representation of the image shown in FIG. 8 and the average luminance of the pixels within each of the convex regions which resulted from the partitioning of the image;

Shown in FIG. 10 is a reconstructed version of the image shown in FIG. 8 when an average value description is employed for each of the convex regions; and Shown in FIG. 11 is a reconstructed version of the original image shown in FIG. 8 when a fast order polynomial description is employed for each of the convex regions.

DETAILED DESCRIPTION

Shown in FIG. 1 is a flow chart of the preferred embodiment of a method for representing an image using a binary space partitioning tree, in accordance with the principles of the invention. Shown in FIG. 2 is image 200, which is employed to demonstrate the operation of the method shown in FIG. 1. For clarity of exposition, a simple image has been chosen as image 200. Image 200 is also denoted as image I and will be so referred to hereinafter. Furthermore, shown in FIG. 3 is edge image E corresponding to the boundaries of image I. Edge image E can be derived from image I by using any of the well-known edge detection methods, e.g., the Canny edge detector. (See J. F. Canny, "A Computational Approach to Edge Detection," IEEE Trans. Pattern Anal. Machine Intell., vol. PAMI-8, pp. 679–698, November 1986.)

The following variables are employed in the description of the method. D is the (current) image domain under consideration. $D_1$ and $D_2$ are the two subdomains that result from the partitioning of domain D by a straight line. $N_1$ and $N_2$ are the number of edge points within subdomains $D_1$ and $D_2$, respectively. An edge point is a point within edge image E. A point is the size of one pixel of image I. $A_1$ and $A_2$ are the respective areas of $D_1$ and $D_2$. Descriptions $m_1$ and $m_2$ are particular ones of a predetermined plurality of descriptions of the image function I over $D_1$ and $D_2$, respectively. $T_a$ is an area threshold for a partitioned region. A region having less than $T_a$ area is not considered partitionable. $T_e$ is a threshold for the minimum number of edge points within a partitioned region. A region having less than $T_e$ edge points is also considered to be unpartitionable. $T_a$ and $T_e$ are used to terminate the partitioning of the image domain.

Referring now to FIG. 1, the method begins in step 101 when a signal containing a representation of a new image I is received for encoding. Typical sources of such an image signal may be a video signal, an image scanner or a prestored image in the memory of a computer. In step 105 edge image E (FIG. 3) is derived. In step 110, current domain D is set equal to the entire image domain. Thereafter, in step 115, the well known Hough transform (HT) is computed for all edge points in domain D. (See U.S. Pat. No. 3,069,654 issued to Paul V. C. Hough on Dec. 18, 1962.) Shown in FIG. 4 is a Hough transform corresponding to edge image E of FIG. 3. For clarity of exposition purposes, FIG. 4 only shows the four strongest Hough transform peaks. These peaks correspond to the four edges of object 210 shown in FIG. 2. FIG. 4 shows the Hough space in a manner defined using the well known $(\rho,\theta)$ parameterization. (See R. O. Duda and P. E. Hart, "Use of the Hough Transformation to Detect Lines and Curves in Pictures", CACM, 15, 11–15, 1972.) As described in more detail hereinbelow, FIG. 5 shows the selected partitioning lines and the unpartitioned convex regions which result from applying the method of FIG. 1 to image I. In FIGS. 2–6 each line or region is represented by the same last number of the reference numeral.

Returning to FIG. 1, in step 120 the $(\rho,\theta)$ coordinates of the point having the greatest value (peak) in the Hough space, i.e., the HT peak, is selected and designated $h_0$. These coordinates represent the selected partitioning line, which will be used to partition domain D into two subdomains. This partitioning line is also referred to as $h_0$. The partitioning of domain D by $h_0$ into subdomains $D_1$ and $D_2$ is performed in step 125. During an initial iteration of step 120 the partitioning line $h_0$ corresponds to point 401 (FIG. 4) and line 501 (FIG. 5). During this initial partitioning, subdomain $D_1$ is the image domain to the right of partitioning line 501. Correspondingly, subdomain $D_2$ is the region to the left of line 501. The choice of which of the regions resulting from the partitioning is designated as $D_1$ or $D_2$ is determined according to a fixed rule applicable in the same manner to each partitioning step. This rule is arbitrarily selected by the implementor. An exemplary rule is that $D_1$ is always the region to the right of line $h_0$ unless the partitioning $h_0$ has no slope in which case $D_1$ is always the region above $h_0$. A description of selected line $h_0$ is stored in a non-leaf node of a signal corresponding to a binary tree that is developed by the method to represent the image, in accordance with the principles of the invention. During the initial iteration of step 120, $h_0$ is represented by the root node of the binary tree. Shown in FIG. 6 is an exemplary binary tree structure for representing image I (FIG. 2) in accordance with the principles of the invention. Accordingly, root node 601 contains a representation of partitioning line 501, which is the line $h_0$ determined during the first iteration of the method. In other words, each non-leaf node of the tree contains a representation embodying the $\theta$ and $\rho$ values of the corresponding partitioning line $h_0$. Such non-leaf nodes are cross-hatched to indicate that they contain a signal describing a line. Each selected line $h_0$ has a length that extends only within the boundaries of current domain D under consideration.

Thereafter, conditional branch point 130 (FIG. 1) tests to determine if $(A_1<T_a)$ or $(N_1<T_e)$. If $A_1<T_a$ is true, the area of domain $D_1$ is less than the predetermined threshold value $T_a$. Therefore, in accordance with an aspect of the invention, domain $D_1$ is too small to be further partitioned and the original signal of image I within domain $D_1$ can be represented by a particular description. Such a description may be selected from a palette containing a plurality of predetermined descriptions. Alternatively, each such description may be of a predetermined parametric form, including such parameters as the average luminance value of the pixels in image I that are within domain $D_1$ or parameters for use with higher-order polynomial functions that describe the image luminance within $D_1$. If $N_1<T_e$ is true, the number of edge points within domain $D_1$ is smaller than the predetermined threshold value $T_e$. Therefore, in accordance with an aspect of the invention, the number of edge points is too small to warrant an additional partitioning of domain $D_1$.

If the test result in step 130 is NO, control is passed to step 135 wherein, in accordance with an aspect of the invention, the method is recursively called at step 115. As a part of the recursive invocation, current domain D is set equal to the subdomain $D_1$. The method will therefore process what was subdomain $D_1$ in the same manner as if it were originally the entire image. Upon conclusion of the recursive processing of subdomain $D_1$ in step 135, control is passed to step 145. Recursion is well known in the art. Furthermore, those skilled in the art will also be able to implement the method in a non-recursive manner.

In accordance with an aspect of the invention, if the test result in step 130 is YES, control is passed to step 140, in which the particular description, e.g., $m_1$, which most closely approximates the original image signal within domain $D_1$ is selected or determined. In accordance with the principles of the invention, the description $m_1$ is stored as a leaf node of the aforementioned binary tree. In FIG. 5 region 503 represents the first unpartitioned convex region which results from applying the method of FIG. 1 to image I. Thus, for image I, the test result in step 130 will be YES for the first time only after the second recursive iteration of the method. When the test result is YES for the first time, leaf node 603 (FIG. 6) will be added to binary tree 600, in accordance with an aspect of the invention. To represent the description of the average value of the pixels in region 503, (FIG. 5) which is stored in leaf node 603, leaf node 603 is colored white.

Control is passed from step 140 (FIG. 1) to conditional branch point 145, in which the same test as was performed in step 130 for subdomain $D_1$ is repeated in a corresponding manner, for subdomain $D_2$. If the test result in step 145 is NO, control is passed to step 150 in which the method is called recursively at step 115 as described above for step 135 except that, as part of this recursive invocation, the current domain D is set to subdomain $D_2$. Upon conclusion of the recursive processing of subdomain $D_2$ in step 150, control is passed to step 160 and the process is ended. If the test result in step 145 is YES, control is passed to step 155 in which a particular description, e.g., $m_2$, which most closely approximates the original image signal I within domain $D_2$ is selected or determined. Description $m_2$ is represented as a leaf node of binary tree 600 (FIG. 6). Thereafter, control is passed from step 155 (FIG. 1) to 160 by which either a particular level of recursion, or the entire method is exited.

For a more complete understanding, a description of the results as the method shown in FIG. 1 is executed for the image shown in FIG. 2, is given below. An additional superscript indicating the level of recursion is added to each domain designation. As mentioned above, initially domain D is set to the entire image domain and the first line selected to partition $D^1$ is line 501 (FIG. 5). A signal representing the $(\rho,\theta)$ parameterization of this line is stored in root node 601 (FIG. 6). During this first iteration, the test result in step 130 is NO. Therefore, control is passed to step 135 in which domain D is set to the region of the image to the right of line 501, which was subdomain $D_1^1$ determined in step 125, and the routine is recursively called at step 115. During this second iteration, the straight line $h_0^2$ selected to partition current $D^2$ is line 502 (FIG. 5). This corresponds to point 402 (FIG. 4). Similar to root node 601 (FIG. 6), non-leaf node 602 stores a signal representing the $(\rho,\theta)$ parameterization of line 502. During this iteration the test result in step 130 (FIG. 1) is YES. Therefore, the average value of all the pixels in region 503 is stored in leaf node 603. Thereafter, control is passed to step 145 in which the method tests the region to the left of line 502 (FIG. 5) and to the right of line 501, which is domain $D_2^2$ of current domain $D^2$. The test result in step 145 is NO and, therefore, the method is recursively called again for the third time and domain $D^3$ is set to the aforementioned region $D_2^2$.

During this third recursive iteration, the line $h_0^3$ selected to partition current domain $D^3$ is line 504 (FIG. 5), which corresponds to the HT peak 404, (FIG. 4). The test result in step 130, (FIG. 1) is again YES, and the average value of the pixels within region 505 is stored in leaf node 605 (FIG. 6). Since all the pixels in region 505 are white, the average value of the pixels in region 505, which is stored in leaf node 605 is white and, therefore, leaf node 605 is colored white. Thereafter, the test result in step 145 is NO, and again, the method is recursively called at step 115 with domain $D^4$ being equal to the region below line 504 and in between lines 501 and 502 which was $D_2^3$. During this fourth iteration, the line $h_0^4$ selected to partition current domain $D^4$ is line 506, which corresponds to HT peak 406. The test result in step 130 is YES and, therefore, the average value of the pixels in region 507 is stored in leaf node 607. Since region 507 is a gray colored region, node 607 is colored gray to represent the average value of the pixels in the region which is stored therein. Thereafter, the test result in step 145 is also YES and the average value of the pixels in region 508 is stored in leaf node 608. The current recursive iteration of the method is completed in step 160 and control is returned back to the step from which the current iteration of the method was called, i.e., step 160 of the previous recursive iteration. Similarly, the third and second recursive iterations of the method are exited, sequentially, in step 160. Control is, therefore, returned to step 145 of the initial iteration for which the test result is YES. Therefore, the average value of the pixels in region 509 is stored in leaf node 609 and the method finally terminates in step 160.

Shown in FIG. 7 is an exemplary image encoding, transmission and reproduction system, embodying principles of the invention. An image signal is received on line 730 by boundary-based binary space partition (BSP) tree generation unit 735. BSP tree generation unit 735 performs the method shown in FIG. 1 and supplies as an output on line 740 a signal containing a BSP tree representation of the original image signal. The BSP tree representation of the original image signal is received as an input by BSP tree coding unit 745 which encodes the partitioning lines, represented in the non-leaf nodes, and the descriptions of the image signal within each of the convex regions, which are represented by the leaf nodes of the BSP tree. The encoded BSP tree is transmitted via transmission line 750 to BSP tree decoding unit 755. BSP tree decoding unit 755 performs the inverse of BSP tree coding unit 745 and supplies as an output on line 760 a signal containing the decoded BSP tree representation. This representation is supplied to BSP tree rendering unit 765 which traverses the BSP tree in a predetermined manner and generates a signal containing a reconstructed version of the original image. This signal is supplied as an output on line 770. One particular traversal scheme which may be employed for traversing the BSP tree is the well-known pre-order traversal algorithm. BSP tree generation unit 735, BSP tree coding unit 745, transmission line 750, BSP tree decoding unit 755 and BSP tree rendering unit 765 may all contain memory units (not shown for clarity purposes) for storing the various above mentioned signals.

Shown in FIG. 8 is an exemplary original image. Such an image could be scanned and the resulting image signal supplied as an input image signal on line 730. FIG. 9 shows the partitioning lines which were selected in the generation of a BSP tree representation of the image shown in FIG. 8. Also shown in FIG. 9 is the average luminance of the pixels within each of the convex regions which resulted from the partitioning of the original image contained in the input image signal on line 730. FIG. 10 shows a reconstructed version of the original image shown in FIG. 8 as rendered by unit 765 of FIG. 7 when boundary based BSP tree generation 735 employed an average value description for each of the convex regions. FIG. 11 shows a reconstructed version of the original image shown in FIG. 8 rendered by unit 765 of FIG. 7 when boundary based BSP tree generation 735 employed a first order polynomial description for each of the convex regions.

The above described embodiment is merely illustrative of the principles of the invention and other modifications and variations thereof may be devised by those skilled in the art without departing from the spirit and scope of the invention. Extension of the method disclosed as the preferred embodiment will be readily apparent to one skilled in the art so that they can employ any arbitrarily shaped geometric curve, which can be uniquely represented using a finite number of parameters, to partition image domain D. If such arbitrarily shaped geometric curves are employed, image domain D will be segmented into a finite number of arbitrarily shaped connected regions. Also, extension of the technique of the preferred embodiment into additional dimensions will be readily apparent. An image, which has N dimensions, can be partitioned into a set of bounded arbitrarily shaped regions. This partitioning is achieved through the use of arbitrarily shaped N−1 dimensional surfaces which pass through the boundaries of the image. The arbitrarily shaped regions are represented in the leaf nodes of a binary tree and the arbitrarily shaped surfaces, which are used to partition the image, are represented in the non-leaf nodes of the tree. For example, arbitrarily oriented planes can be selected to partition a volume image into a set of convex polyhedra. A volume image can be a three dimensional space image or a temporal image consisting of a time sequence of images.

We claim:

1. A method for use in developing in an image coding system a signal that represents an image having N dimensions contained within a signal containing images, said method comprising the steps of:

selecting a set of arbitrarily shaped surfaces having N−1 dimensions which are representable by a finite number of parameters, each of said surfaces being selected from any of the surfaces that intersect and partition said image; said surfaces partitioning said image into a finite set of bounded arbitrarily shaped regions; and forming a signal representing a binary tree in such a way that each non-leaf node of the binary tree contains at least a description of at least one arbitrarily shaped surface of the set of arbitrarily shaped surfaces and each leaf node of said binary tree contains at least a description of one of said bounded arbitrarily shaped regions that description being a representation of an estimate of the nature of the signal for said image within said one region.

2. A method, for use in an image coding system, to develop a signal that represents at least one image contained within a signal containing images, said method comprising the steps of:

selecting a set of arbitrarily oriented lines that partition the image into a set of unpartitioned convex regions each of said lines being selected from any of the lines that intersect and partition said image;

assigning a description to each of said unpartitioned convex regions, said description being an estimate of the nature of the signal for said image within the region to which it is assigned;

forming a signal representing a binary tree in a such way that each non-leaf node of the binary tree contains at least a description of at least one line of the set of arbitrarily oriented lines and each leaf node of said binary tree contains at least a description for one of said unpartitioned convex regions.

3. The invention as described in claim 2 further including the step of supplying said signal representing said binary tree as an output of said image coding system.

4. The invention as described in claim 2 further including the step of storing said signal representing said binary tree in a memory.

5. The invention as described in claim 2 wherein the individual descriptions assigned to each of said convex regions are chosen from a plurality of predetermined descriptions.

6. The invention as described in claim 2 wherein said step of selecting is performed in a recursive manner on each new region which results from partitioning of a prior region by a selected line.

7. The invention as described in claim 2 wherein said step of assigning further includes the steps of:

determining if said region should not be further partitioned; and developing an estimate of the nature of the signal for the at least one image within the region to which it is assigned if said region should not be further partitioned.

8. Apparatus, for use in an image coding system for developing a signal that represents at least one image contained within a signal containing images, the apparatus comprising:

means for selecting an arbitrarily oriented line for partitioning a predetermined domain of said image into two subdomains said line being selected from any of the lines that intersect and partition said domain;

means for determining if a particular subdomain derived from a partitioning of said domain by a line selected by said means for selecting should not be further partitioned;

means for assigning a description to said particular subdomain if said means for determining has determined that said particular subdomain should not be further partitioned, said description being an estimate of the nature of the signal for said image within said particular subdomain; and means for developing a signal representing a binary tree, said binary tree being such that a description of said line is contained within at least one non-leaf node of the binary tree and said description of said particular subdomain, if assigned, is contained within at least one leaf node of said binary tree.

9. The invention as described in claim 8 further including:

means for storing particular values for said domain, said subdomains, said line and said description;

means for reinitializing said means for selecting, said means for determining and said means for assigning a description;

means for assigning said domain to be a predetermined one of said subdomains; and means for restarting said means for selecting, said means for determining and said means for assigning a description.

10. The invention as described in claim 9 further including means for retrieving particular values for said domain, said subdomains, said line and said description from said means for storing.

11. The invention as described in claim 9 wherein said means for selecting includes means for deriving the location of edge points of said image.

12. A method, for use in an image coding system, to develop a signal that represents an at least one image contained within a signal containing images, said method comprising the steps of:

selecting an arbitrarily oriented line to partition a predetermined domain of said image into two subdomains said line being selected from any of the lines that intersect and partition said domain;

developing a signal representing a binary tree, said binary tree being such that a description of said line is contained within at least one non-leaf node of the binary tree;

determining for each particular one of said subdomains if that particular subdomain should not be partitioned further;

assigning a description to each of the subdomains that should not be further partitioned, as determined by said step of determining, and placing at least one of said descriptions within at least one leaf node of said binary tree; and recursively restarting said method for each of said particular subdomains that should be further partitioned, said restarting performed in a manner such that said predetermined domain upon such restarting is equal to said particular subdomain.

13. The invention as described in claim 12 wherein, in said step of developing, said descriptions are placed in said leaf nodes in a manner such that only one description is placed in each leaf node.

14. A method for use in developing in an image coding system a signal that represents an image having N dimensions contained within a signal containing images, said method comprising the steps of:

selecting a set of arbitrarily shaped surfaces having N–1 dimensions which are representable by a finite number of parameters, the shape of each of said arbitrarily shaped surfaces being other than solely limited to a shape selected from a predefined set of orthogonal shapes, said surfaces partitioning said image into a finite set of bounded arbitrarily shaped regions; and forming a signal representing a binary tree in such a way that each non-leaf node of the binary tree contains at least a description of at least one arbitrarily shaped surface of the set of arbitrarily shaped surfaces and each leaf node of said binary tree contains at least a description of one of said bounded arbitrarily shaped regions that description being a representation of an estimate of the nature of the signal for said image within said one region.

15. A method, for use in an image coding system, to develop a signal that represents at least one image contained within a signal containing images, said method comprising the steps of:

selecting a set of arbitrarily oriented lines that partition the image into a set of unpartitioned convex regions, the angle of orientation of each of said arbitrarily oriented lines being other than solely limited to an angle selected from a predefined set of orthogonal angles;

assigning a description to each of said unpartitioned convex regions, said description being an estimate of the nature of the signal for said image within the region to which it is assigned;

forming a signal representing a binary tree in a such way that each non-leaf node of the binary tree contains at least a description of at least one line of the set of arbitrarily oriented lines and each leaf node of said binary tree contains at least a description for one of said unpartitioned convex regions.

16. Apparatus, for use in an image coding system for developing a signal that represents at least one image contained within a signal containing images, the apparatus comprising:

means for selecting an arbitrarily oriented line for partitioning a predetermined domain of said image into two subdomains, the angle of orientation of said selected line being other than solely limited to an angle selected from a predefined set of orthogonal angles;

means for determining if a particular subdomain derived from a partitioning of said domain by a line selected by said means for selecting should not be further partitioned;

means for assigning a description to said particular subdomain if said means for determining has determined that said particular subdomain should not be further partitioned, said description being an estimate of the nature of the signal for said image within said particular subdomain; and means for developing a signal representing a binary tree, said binary tree being such that a description of said line is contained within at least one non-leaf node of the binary tree and said description of said particular subdomain, if assigned, is contained within at least one leaf node of said binary tree.

17. A method, for use in an image coding system, to develop a signal that represents an at least one image contained within a signal containing images, said method comprising the steps of:

selecting an arbitrarily oriented line to partition a predetermined domain of said image into two subdomains, the angle of orientation of said selected line being other than solely limited to an angle selected from a predefined set of orthogonal angles;

developing a signal representing a binary tree, said binary tree being such that a description of said line is contained within at least one non-leaf node of the binary tree;

determining for each particular one of said subdomains if that particular subdomain should not be partitioned further;

assigning a description to each of the subdomains that should not be further partitioned, as determined by said step of determining, and placing at least one of said descriptions within at least one leaf node of said binary tree; and recursively restarting said method for each of said particular subdomains that should be further partitioned, said restarting performed in a manner such that said predetermined domain upon such restarting is equal to said particular subdomain.

* * * * *